United States Patent
Agata (10) Patent No.: US 9,618,811 B2
(45) Date of Patent: Apr. 11, 2017

(54) MULTIPLE CIRCUIT BOARD FOR LIQUID CRYSTAL DISPLAY PANELS AND METHOD FOR MANUFACTURING LIQUID CRYSTAL DISPLAY PANELS

(71) Applicant: Japan Display Inc., Tokyo (JP)

(72) Inventor: Kentaro Agata, Tokyo (JP)

(73) Assignee: Japan Display Inc., Tokyo (JP)

( * ) Notice: Subject to any disclaimer, the term of this patent is extended or adjusted under 35 U.S.C. 154(b) by 399 days.

(21) Appl. No.: 14/270,390

(22) Filed: May 6, 2014

(65) Prior Publication Data

US 2014/0362318 A1    Dec. 11, 2014

(30) Foreign Application Priority Data

Jun. 6, 2013   (JP) ................. 2013-120108

(51) Int. Cl.
G02F 1/1345    (2006.01)
G02F 1/1362    (2006.01)
G02F 1/1333    (2006.01)

(52) U.S. Cl.
CPC .. G02F 1/136204 (2013.01); G02F 1/133351 (2013.01)

(58) Field of Classification Search
CPC ............... G02F 1/136204; G02F 1/133351
USPC ............................................. 349/149
See application file for complete search history.

(56) References Cited

FOREIGN PATENT DOCUMENTS

| | | |
|---|---|---|
| CN | 101825821 A | 9/2010 |
| CN | 102736336 A | 10/2012 |
| CN | 102810303 A | 12/2012 |
| JP | 11-282386 | 10/1999 |
| JP | 2011-232385 | 11/2011 |

OTHER PUBLICATIONS

Chinese Office Action of Jun. 28, 2016 for corresponding Chinese Patent application No. 201410247110.8.

Primary Examiner — Lucy Chien
(74) Attorney, Agent, or Firm — Typha IP LLC (57) ABSTRACT

A multiple circuit board includes a board having a plurality of product regions respectively corresponding to a plurality of array boards and an out-of-product region, out-of-product wires provided in the out-of-product region, waveform wires electrically connected to the out-of-product wires and extending to depict waveforms to alternately pass inside and outside of the respective product regions, circuit elements provided in respective display regions of the plurality of product regions, scanning circuits provided adjacent to the respective display regions of the plurality of product regions, and a plurality of scanning lines extending from the scanning circuits to both sides in each of the product regions and connecting to the circuit elements at one side and connecting to the waveform wires inside the product region at the other side.

5 Claims, 7 Drawing Sheets

MULTIPLE CIRCUIT BOARD FOR LIQUID CRYSTAL DISPLAY PANELS AND METHOD FOR MANUFACTURING LIQUID CRYSTAL DISPLAY PANELS

CROSS-REFERENCE TO RELATED APPLICATION

The present application claims priority from Japanese application JP2013-120108 filed on Jun. 6, 2013, the content of which is hereby incorporated by reference into this application.

BACKGROUND OF THE INVENTION

1. Field of the Invention

This invention relates to a multiple circuit board for liquid crystal display panels and a method for manufacturing liquid crystal display panels.

2. Description of the Related Art

Liquid crystal display panels are generally driven by a matrix system. In the matrix system, a plurality of data lines and a plurality of scanning lines extend in directions in which the lines intersect. When a scanning signal is input to the scanning line, the scanning line is selected, and signals of the data lines are applied to pixels corresponding to the selected scanning line.

In related art, as measures for electrostatic breakdown, data lines are connected to a protection circuit and a control signal line of a scanning circuit is connected to a common line outside of the product, however, any particularly effective measures have not been taken for scanning lines.

JP 11-282386 A has disclosed, in the manufacture of active-matrix board devices for liquid crystal panels with built-in drivers, prevention of electrostatic breakdown of various wires, elements, etc. on boards using conducting protection patterns. However, no measures for electrostatic breakdown of circuit elements connected to scanning lines have been specifically disclosed.

SUMMARY OF THE INVENTION

An object of the invention is to prevent electrostatic breakdown of circuit elements connected to scanning lines.

(1) A multiple circuit board according to the invention is a multiple circuit board for cutting into a plurality of array boards used for a plurality of liquid crystal display panels, including a board having a plurality of product regions respectively corresponding to the plurality of array boards and an out-of-product region, out-of-product wires provided in the out-of-product region, waveform wires electrically connected to the out-of-product wires and extending to depict waveforms to alternately pass inside and outside of the respective product regions, circuit elements provided in respective display regions of the plurality of product regions, scanning circuits provided adjacent to the respective display regions of the plurality of product regions, and a plurality of scanning lines extending from the scanning circuits to both sides in each of the product regions and connecting to the circuit elements at one side and connecting to the waveform wires inside the product region at the other side. According to the invention, the scanning lines are connected to the out-of-product wires via the waveform wires, and static electricity may be transferred to the out-of-product wires. Thereby, electrostatic breakdown of the circuit elements may be prevented. Further, the waveform wires have shapes depicting waveforms, and may be cut along the straight lines into pieces. Therefore, the plurality of scanning lines electrically conducting to each other through connection to the waveform wires may be electrically separated by one cutting process.

(2) In the multiple circuit board according to (1), the plurality of product regions may be arranged in a longitudinal direction and a lateral direction, the two or more adjacent product regions arranged in the lateral direction may abut each other via cut lines for cutting into the plurality of array boards, and the waveform wires may have portions alternately passing ends of the product regions adjacent to each other in the lateral direction.

(3) In the multiple circuit board according to (2), a pair of the scanning circuits may be provided at both sides of the display region.

(4) In the multiple circuit board according to (3), each of the plurality of scanning lines may be connected to the one scanning circuit and not connected to the other scanning circuit, the scanning lines adjacent to each other may be connected to the scanning circuits at opposite sides to each other, and each of the scanning lines may be connected to the waveform wires adjacent to the connected one scanning circuit.

(5) In the multiple circuit board according to (3), the waveform wires may alternately bend to the right and left in the lateral direction, connect to the plurality of scanning lines at convex sides on one of the right and left, and have branch wires extending from concave sides on the other of the right and left and entering the product regions adjacent in the lateral direction, the plurality of scanning lines of the respective product regions may laterally abut the plurality of scanning lines of the product regions adjacent in the lateral direction, and one of the pair of scanning lines adjacent to each other in the product regions adjacent to each other in the lateral direction may be connected to the waveform wire at the convex side and the other may be connected to the waveform wire at the concave side via the branch wire.

(6) In the multiple circuit board according to any one of (2) to (5), the waveform wires may further have portions alternately passing inside and outside of ends without the adjacent product regions of the product regions located at ends in lateral arrangements.

(7) In the multiple circuit board according to any one of (2) to (6), the out-of-product region may include a frame-like region surrounding the plurality of product regions and partition regions passing between the product regions adjacent to each other in the longitudinal direction, and the out-of-product wires may continuously pass in the frame-like region and the partition regions.

(8) In the multiple circuit board according to any one of (1) to (7), the waveform wire may be formed using a semiconductor.

(9) A method for manufacturing liquid crystal display panels according to the invention includes preparing a multiple circuit board having a board having a plurality of product regions and an out-of-product region used for a plurality of liquid crystal display panels, out-of-product wires provided in the out-of-product region, waveform wires electrically connected to the out-of-product wires and extending to depict waveforms to alternately pass ends of the adjacent product regions, circuit elements provided in respective display regions of the plurality of product regions, scanning circuits provided adjacent to the respective display regions of the plurality of product regions, and a plurality of scanning lines extending from the scanning circuits to both sides in each of the product regions and connecting to the circuit elements at one side and connecting to the waveform wires inside the product region at the other side, and cutting the multiple circuit board in correspondence with the plurality of product regions, wherein cutting the multiple circuit board includes separating the adjacent product regions in which the waveform wires alternately pass along one cut line, the one cut line passes a location to separate the waveform depicted by the waveform wires into two half waveforms in which a plurality of convex parts are alternately arranged at opposite sides to each other with gaps, and the plurality of scanning lines are connected to the waveform wires at the convex sides. According to the invention, only by separating the adjacent product regions along one cut line, the waveform wires may be separated with respect to each convex part. Therefore, the plurality of scanning lines electrically conducting to each other through connection to the waveform wires may be electrically separated by one cutting process. Further, the scanning lines are connected to the out-of-product wires via the waveform wires, and static electricity may be transferred to the out-of-product wires. Thereby, electrostatic breakdown of the circuit elements may be prevented.

(10) In the method for manufacturing liquid crystal display panels according to (9), the waveform wires may have branch wires entering the adjacent product regions from the concave sides opposite to the convex parts, the plurality of scanning lines of the respective product regions may abut the plurality of scanning lines of the adjacent product regions, one of the pair of scanning lines adjacent to each other in the adjacent product regions may be connected to the waveform wire at the convex side and the other may be connected to the waveform wire at the concave side via the branch wire, and the cutting the multiple circuit board may include cutting the branch wires along the one cut line.

DETAILED DESCRIPTION OF THE INVENTION

As below, embodiments of the invention will be explained with reference to the drawings.

Figure 1:
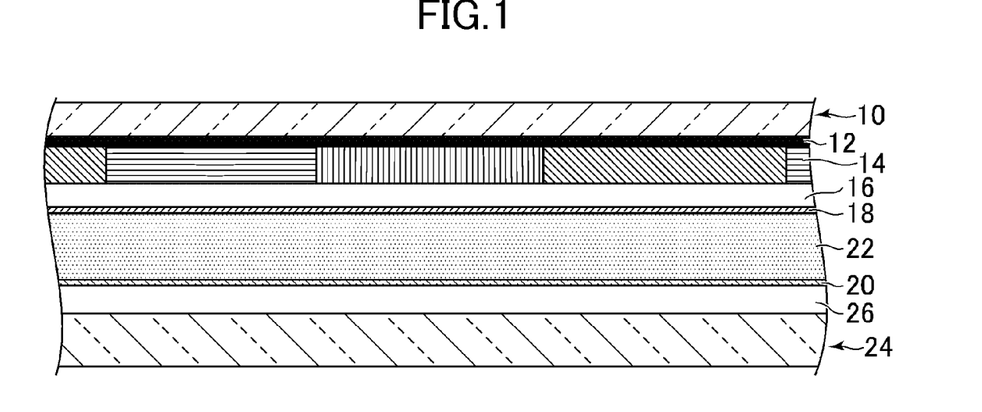
FIG. 1 is a sectional view showing a liquid crystal display panel.

FIG. 1 is a sectional view showing a liquid crystal display panel. The liquid crystal display panel has a color filter board 10. The color filter board 10 includes a black matrix 12, a color filter layer 14, a planarizing layer 16, and a first alignment film 18. A second alignment film 20 is provided to be opposed to the first alignment film 18 with a cell gap in between. A liquid crystal material 22 is provided between the first alignment film 18 and the second alignment film 20.

An array board 24 is provided to be opposed to the color filter board 10. The array board 24 includes a circuit layer 26. A circuit for driving the liquid crystal material 22 is formed in the circuit layer 26. The second alignment film 20 is formed on the circuit layer 26. As a modified example, a color filter layer may be formed on the array board 24 and, in this case, the array board 24 also serves as the color filter board and the above described color filter board 10 is simply an opposite board.

Figure 2:
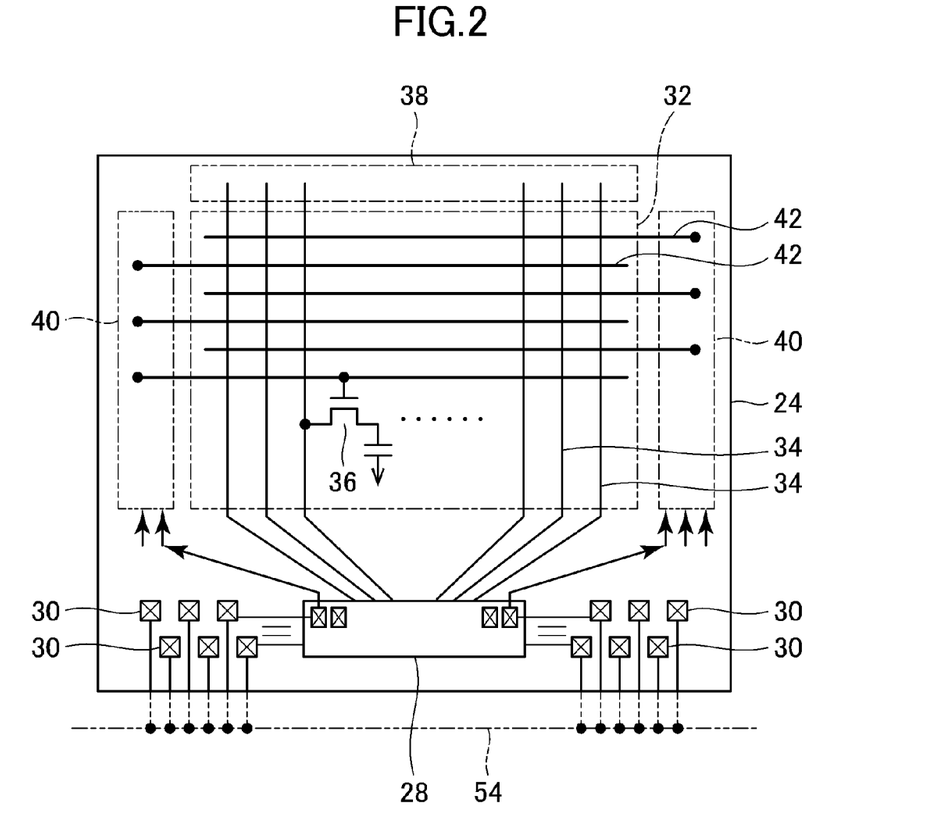
FIG. 2 shows a circuit formed on an array board.

FIG. 2 shows the circuit formed on the array board 24. Specifically, the circuit includes a circuit formed in the circuit layer 26 shown in FIG. 1 and a circuit built in an integrated circuit chip 28 mounted on the array board 24. The array board 24 has a plurality of pads 30 for input and output or inspection. The pads 30 and the integrated circuit chip 28 are connected via wires. The array board 24 has a display region 32 for displaying images.

A plurality of signal lines 34 are drawn from the integrated circuit chip 28 into the display region 32. In the display region 32, thin-film transistors 36 for controlling application of voltages to the liquid crystal material 22 are provided. Measures for electrostatic breakdown are taken by connecting the plurality of signal lines 34 to a protection circuit 38.

Scanning circuits 40 are provided outside the display region 32. A plurality of scanning lines 42 are drawn from the scanning circuits 40 into the display region 32. The scanning lines 42 are connected to gate electrodes of the thin-film transistors 36. Video signals applied to the signal lines 34 are controlled by the scanning signals (clock signals) input from the scanning circuits 40 to the scanning lines 42. Then, the liquid crystal material 22 is driven by the voltages of the video signals.

Figure 3:
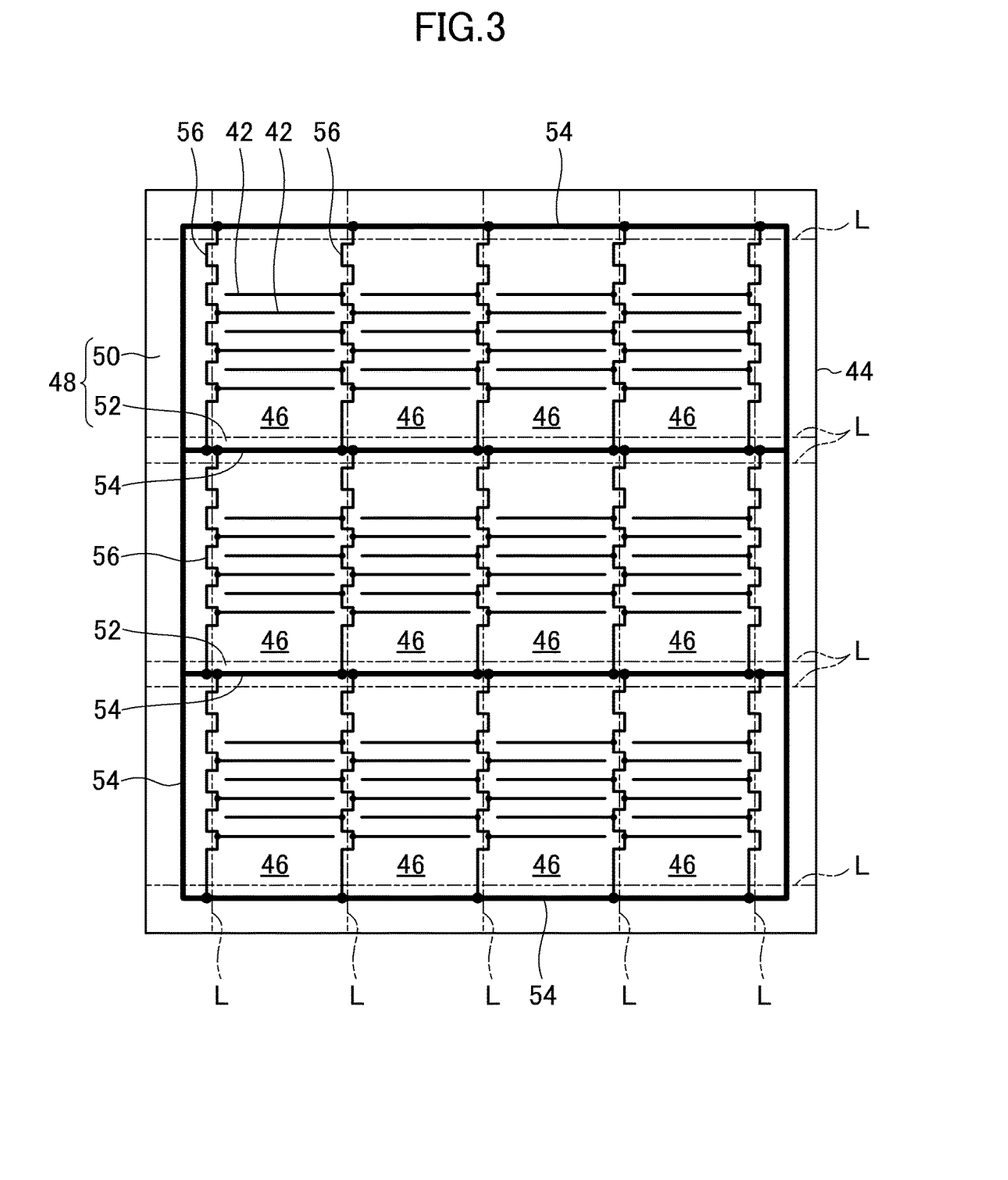
FIG. 3 is a plan view showing a multiple circuit board according to an embodiment to which the invention is applied.

FIG. 3 is a plan view showing a multiple circuit board according to an embodiment to which the invention is applied. The multiple circuit board is cut, and thereby, a plurality of the array boards 24 (see FIG. 2) used for a plurality of the liquid crystal display panels may be obtained.

The multiple circuit board has a board 44. The board 44 has a plurality of product regions 46 respectively corresponding to the plurality of array boards 24. The plurality of product regions 46 are arranged in a longitudinal direction and a lateral direction. The two or more adjacent product regions 46 arranged in the lateral direction abut each other via cut lines L for cutting into the plurality of array boards 24. That is, when the multiple circuit board is cut along one cut line L, the array boards 24 adjacent to each other in the lateral direction are cut.

The board 44 has an out-of-product region 48 as a region except the product regions 46. The out-of-product region 48 includes a frame-like region 50 surrounding the plurality of product regions 46. The out-of-product region 48 includes partition regions 52 passing between the product regions 46 adjacent to each other in the longitudinal direction. That is, there are the partition regions 52 between the product regions 46 adjacent to each other in the longitudinal direction.

In the out-of-product region 48, out-of-product wires 54 are provided. The out-of-product wires 54 continuously pass in the frame-like region 50 and the partition regions 52. Note that the plurality of pads 30 of the array board 24 shown in FIG. 2 are connected to the out-of-product wire 54 before cutting out from the multiple circuit board into the array boards 24. They are also measures for electrostatic breakdown.

Waveform wires 56 are provided on the board 44. The waveform wires 56 extend to depict waveforms such as rectangular waves, sine waves, triangular waves, or sawtooth waveforms. The waveform wire 56 shown in FIG. 3 has separated portions, however, the entire portions are defined as the waveform wire 56. The waveform wires 56 are electrically connected to the out-of-product wires 54. The waveform wires 56 extend while depicting waveforms alternately passing inside and outside of the respective product regions 46. The waveform wires 56 have portions alternately passing ends of the product regions 46 adjacent to each other in the lateral direction. Further, the waveform wires 56 have portions alternately passing inside and outside of ends without the adjacent product regions 46 (the right ends or the left ends in FIG. 3) of the product regions 46 located at ends in the lateral arrangements (the product regions 46 located rightmost or leftmost in FIG. 3).

Figure 4:
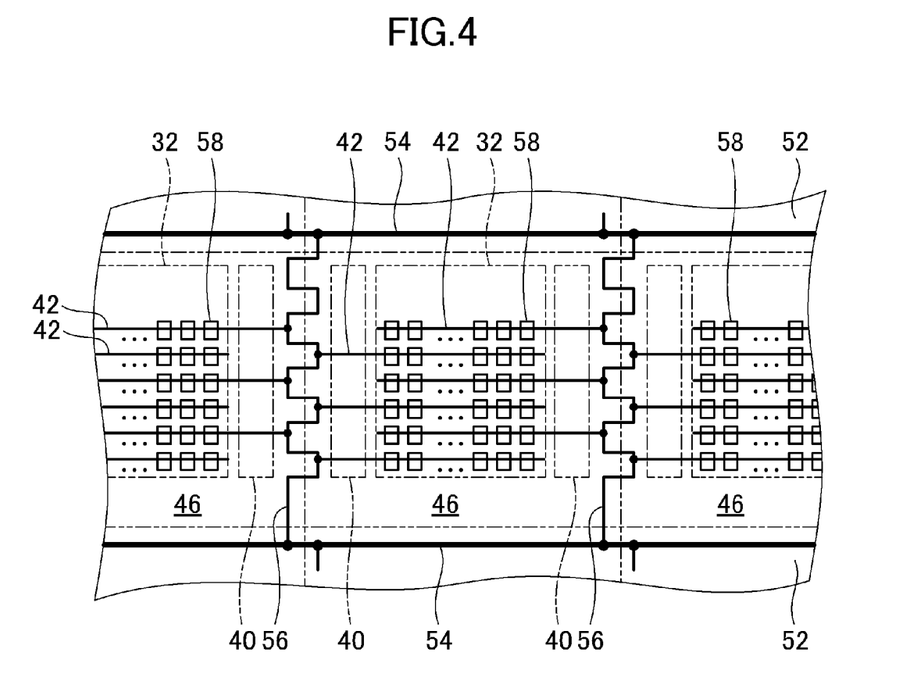
FIG. 4 is an enlarged plan view of a part of the multiple circuit board.

FIG. 4 is an enlarged plan view of a part of the multiple circuit board. Circuit elements 58 are provided in the display region 32 of the product region 46. The circuit elements 58 are the thin-film transistors 36 shown in FIG. 2, for example. In the product region 46, the scanning circuits 40 are provided adjacent to the display region 32. A pair of the scanning circuits 40 are provided at both sides of the display region 32.

In the product region 46, the plurality of scanning lines 42 are provided. The plurality of scanning lines 42 are provided in the display region 32 and connected to the circuit elements 58 in the display region 32. The scanning line 42 extend with one end reaching the scanning circuit 40, but the other end not reaching the scanning circuits 40. That is, the plurality of scanning lines 42 are respectively connected to one scanning circuit 40, but not connected to the other scanning circuit 40. The adjacent scanning lines 42 are alternately connected to opposite scanning circuits 40 to each other.

One end of the scanning line 42 reaching the scanning circuit 40 further extends over the scanning circuit 40. That is, the scanning line 42 extends from the scanning circuit 40 to both sides at one end side. The end of the scanning line 42 over the scanning circuit 40 connects to the waveform wire 56 inside the product region 46. That is, the scanning lines 42 are connected to the waveform wires 56 adjacent to the connected one scanning circuits 40.

According to the embodiment, the scanning lines 42 are connected to the out-of-product wires 54 via the waveform wires 56, and static electricity may be transferred to the out-of-product wires 54. Thereby, electrostatic breakdown of the circuit elements 58 may be prevented. Further, the waveform wires 56 have shapes depicting waveforms, and may be cut along the straight lines into pieces. Therefore, the plurality of scanning lines 42 electrically conducting to each other through connection to the waveform wires 56 may be electrically separated by one cutting process.

Figure 5:
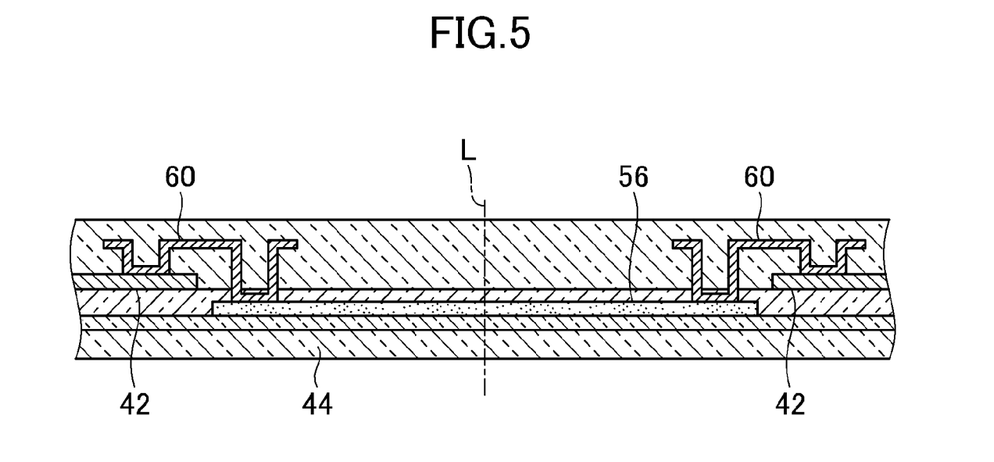
FIG. 5 is a sectional view of a waveform wire cut along an extension direction thereof.

FIG. 5 is a sectional view of the waveform wire 56 cut along an extension direction thereof. The connection between the scanning lines 42 and the waveform wire 56 is made by metal wires 60. The waveform wire 56 is formed using a semiconductor such as polysilicon or amorphous silicon. Semiconductors are less prone to corrosion than metals. Therefore, when the multiple circuit board is cut, even if the waveform wires 56 are cut along the cut lines L and their sections are exposed, the waveform wires 56 are less prone to corrosion.

Figure 6:
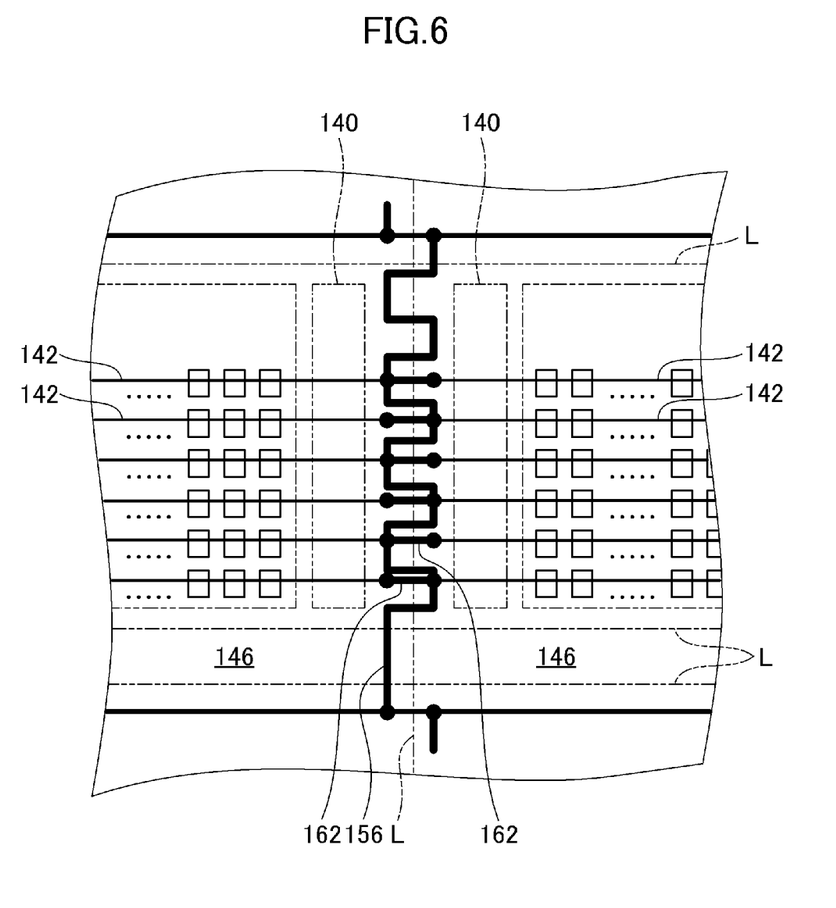
FIG. 6 shows a modified example of the multiple circuit board according to the embodiment.

FIG. 6 shows a modified example of the multiple circuit board according to the embodiment. In this example, scanning lines 142 extend with both ends respectively reaching scanning circuits 140. The plurality of scanning lines 142 are respectively connected to both of the scanning circuits 140.

The respective ends of the scanning lines 142 reaching the scanning circuits 140 further extend over the scanning circuits 140. That is, the scanning lines 142 extend from the scanning circuits 140 to both sides at both end sides. The ends of the scanning lines 142 over the scanning circuits 140 connect to a waveform wire 156 inside the product region 146. That is, the scanning lines 142 are connected to the waveform wire 156 adjacent to the scanning circuits 140.

The waveform wire 156 alternately and laterally bends to the right and left. The waveform wire 156 is connected to the scanning lines 142 at the convex sides on one of the right and left. The waveform wire 156 has branch wires 162 extending from the concave sides on the other of the right and left and entering the product regions 146 adjacent in the lateral direction. The branch wires 162 are also formed using a semiconductor such as polysilicon or amorphous silicon, and thereby, even if the section surfaces are exposed, they are less prone to corrosion.

The plurality of scanning lines 142 of the respective product regions 146 laterally abut the plurality of scanning lines 142 of the product regions 146 adjacent in the lateral direction. One of the pair of scanning lines 142 adjacent to each other in the product regions 146 adjacent to each other in the lateral direction is connected to the waveform wire 156 at the convex side and the other is connected to the waveform wire 156 at the concave side via the branch wire 162.

[Method for Manufacturing Liquid Crystal Display Panels]

Next, a method for manufacturing liquid crystal display panels according to an embodiment to which the invention is applied will be explained. In the embodiment, the multiple circuit board shown in FIG. 3 is prepared. The details of the multiple circuit board are as described above.

The multiple circuit board is cut in correspondence with the plurality of product regions 46. At the step of cutting the multiple circuit board, the adjacent product regions 46 in which the waveform wires 56 alternately pass in the lateral direction are separated along one cut line L. The plurality of scanning lines 42 are connected to the waveform wires 56 at the convex sides before cutting.

Figure 7:
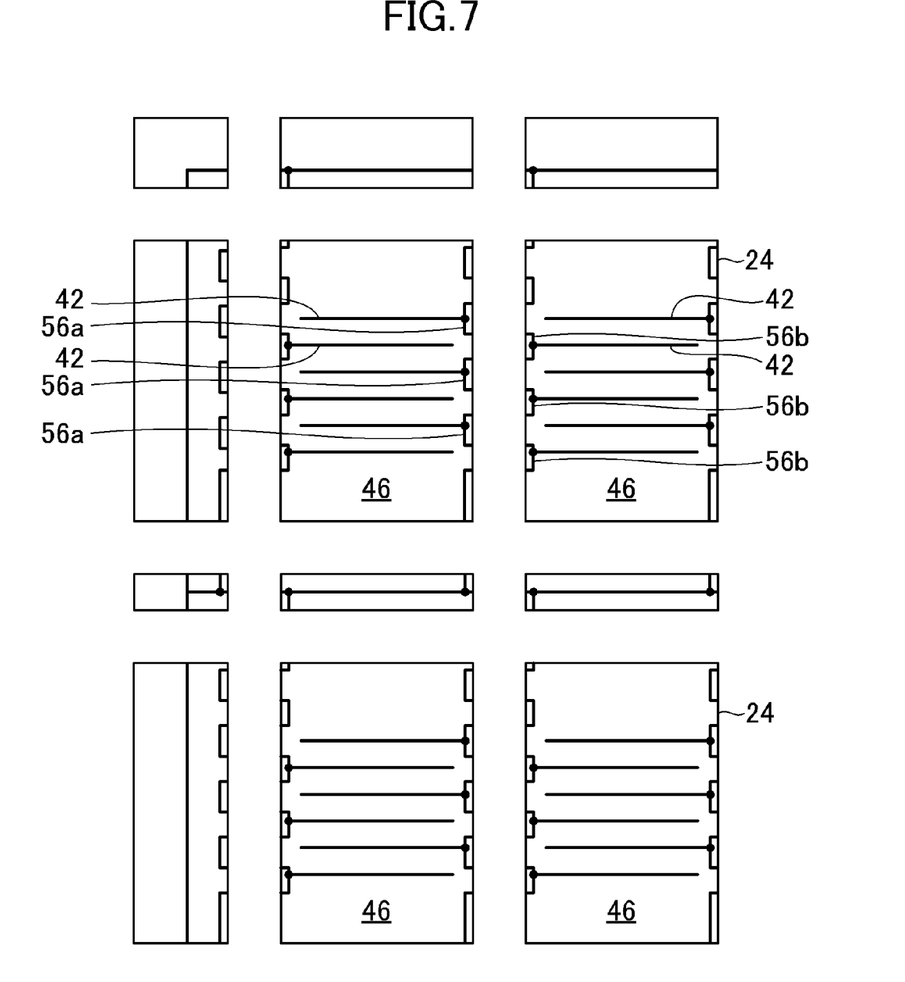
FIG. 7 shows the cut multiple circuit board.

FIG. 7 shows the cut multiple circuit board. The waveforms depicted by the waveform wires 56 shown in FIG. 3 are cut along one cut line L, and separated into two half waveforms in which a plurality of convex parts are alternately arranged at opposite sides to each other with gaps as shown in FIG. 7. That is, the waveform wires 56 depicting the waveforms as shown in FIG. 3 are separated into a plurality of half-waveform portions 56a and a plurality of half-waveform portions 56b as shown in FIG. 7. In the respective product regions 46, the plurality of half-waveform portions 56a and the plurality of half-waveform portions 56b are arranged with convex parts toward the center. Further, the scanning lines 42 are connected to the respective half-waveform portions 56a and half-waveform portions 56b.

According to the embodiment, only by separating the adjacent product regions 46 along one cut line L, the waveform wires 56 may be separated with respect to each convex part. Therefore, the plurality of scanning lines 42 electrically conducting to each other through connection to the waveform wires 56 may be electrically separated by one cutting process. Further, the scanning lines 42 are connected to the out-of-product wires 54 via the waveform wires 56, and static electricity may be transferred to the out-of-product wires 54. Thereby, electrostatic breakdown of the circuit elements 58 may be prevented.

Next, a modified example of the method for manufacturing liquid crystal display panels according to the embodiment to which the invention is applied will be explained. In the modified example, the multiple circuit board shown in FIG. 6 is prepared. Then, at the step of cutting the multiple circuit board, the branch wires 162 are cut along one cut line L. The rest of the method corresponds to the method explained in the above described embodiment.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A multiple circuit board for cutting into a plurality of array boards used for a plurality of display panels, comprising:
    a board having a plurality of product regions respectively corresponding to the plurality of array boards and an out-of-product region;
    out-of-product wires provided in the out-of-product region;
    waveform wires electrically connected to the out-of-product wires and extending to depict waveforms to alternately pass inside and outside of the respective product regions;
    circuit elements provided in respective display regions of the plurality of product regions;
    scanning circuits provided adjacent to the respective display regions of the plurality of product regions; and
    a plurality of scanning lines extending from the scanning circuits to both sides in each of the product regions and connecting to the circuit elements at one side and connecting to the circuit elements at one side and connecting to the waveform wires inside the product region at the other side, wherein
    the plurality of product regions are arranged in a longitudinal direction and a lateral direction,
    the two or more adjacent product regions arranged in the lateral direction abut each other via cut lines for cutting into the plurality of array boards,
    the waveform wires have portions alternately passing ends of the product regions adjacent to each other in the lateral direction,
    a pair of the scanning circuits are provided at both sides of the display region,
    the waveform wires alternately bend to the right and left in the lateral direction, connect to the plurality of scanning lines at convex sides on one of the right and left, and have branch wires extending from concave sides on the other of the right and left and entering the product regions adjacent in the lateral direction,
    the plurality of scanning lines of the respective product regions laterally abut the plurality of scanning lines of the product regions adjacent in the lateral direction, and
    one of the pair of scanning lines adjacent to each other in the product regions adjacent to each other in the lateral direction is connected to the waveform wire at the convex side and the other is connected to the waveform wire at the concave side via the branch wire.

2. The multiple circuit board according to claim 1, wherein the waveform wires further have portions alternately passing inside and outside of ends without the adjacent product regions of the product regions located at ends in lateral arrangements.

3. The multiple circuit board according to claim 1, wherein the out-of-product region includes a frame-like region surrounding the plurality of product regions and partition regions passing between the product regions adjacent to each other in the longitudinal direction, and
    the out-of-product wires continuously pass in the frame-like region and the partition regions.

4. The multiple circuit board according to claim 1, wherein the waveform wire is formed using a semiconductor.

5. A method for manufacturing display panels comprising:
    preparing a multiple circuit board having
    a board having a plurality of product regions and an out-of-product region used for a plurality of display panels,
    out-of-product wires provided in the out-of-product region,
    waveform wires electrically connected to the out-of-product wires and extending to depict waveforms to alternately pass ends of the adjacent product regions,
    circuit elements provided in respective display regions of the plurality of product regions,
    scanning circuits provided adjacent to the respective display regions of the plurality of product regions, and
    a plurality of scanning lines extending from the scanning circuits to both sides in each of the product regions and connecting to the circuit elements at one side and connecting to the waveform wires inside the product region at the other side; and
    cutting the multiple circuit board in correspondence with the plurality of product regions, wherein
    cutting the multiple circuit board includes separating the adjacent product regions in which the waveform wires alternately pass along one cut line,
    the one cut line passes a location to separate the waveform depicted by the waveform wires into two half waveforms in which a plurality of convex parts are alternately arranged at opposite sides to each other with gaps, and
    the plurality of scanning lines are connected to the waveform wires at the convex sides,
    the waveform wires have branch wires entering the adjacent product regions from the concave sides opposite to the convex parts,
    the plurality of scanning lines of the respective product regions abut the plurality of scanning lines of the adjacent product regions,
    one of the pair of scanning lines adjacent to each other in the adjacent product regions is connected to the waveform wire at the convex side and the other is connected to the waveform wire at the concave side via the branch wire, and
    the cutting the multiple circuit board includes cutting the branch wires along the one cut line.

* * * * *